(12) United States Patent
Rogers et al.

(10) Patent No.: US 8,636,120 B1
(45) Date of Patent: Jan. 28, 2014

(54) ACTIVE AND SEMI-ACTIVE RIDE CONTROL WITH ENERGY RECOVERY

(75) Inventors: Jeffrey Allen Rogers, Woodland Park, CO (US); Jeffrey T. Gardner, Woodland Park, CO (US)

(73) Assignee: Sturman Industries, Inc., Woodland Park, CO (US)

( * ) Notice: Subject to any disclaimer, the term of this patent is extended or adjusted under 35 U.S.C. 154(b) by 217 days.

(21) Appl. No.: 13/207,791

(22) Filed: Aug. 11, 2011

Related U.S. Application Data

(60) Provisional application No. 61/375,737, filed on Aug. 20, 2010.

(51) Int. Cl.
*F16F 9/00* (2006.01)

(52) U.S. Cl.
USPC .................. 188/318; 280/5.515; 280/124.157

(58) Field of Classification Search
USPC .......... 280/5.502, 5.507, 5.508, 5.513, 5.515, 280/124.157, 124.159, 124.16, 124.161; 188/266.2, 266.5, 282.2, 282.4, 188/313–315, 317, 318
See application file for complete search history.

(56) References Cited

U.S. PATENT DOCUMENTS

| | | | | |
|---|---|---|---|---|
| 5,098,119 A * | 3/1992 | Williams et al. | ............ | 280/5.507 |
| 6,321,887 B1 * | 11/2001 | Kurusu et al. | ............ | 188/266.2 |
| 6,394,238 B1 * | 5/2002 | Rogala | ............ | 188/266.2 |
| 6,575,484 B2 * | 6/2003 | Rogala et al. | ............ | 280/124.158 |
| 7,448,479 B2 * | 11/2008 | Fukuda et al. | ............ | 188/322.2 |
| 2006/0060438 A1 * | 3/2006 | Honma | ............ | 188/318 |
| 2008/0309045 A1 * | 12/2008 | Johnson et al. | ............ | 280/124.161 |
| 2009/0260935 A1 * | 10/2009 | Avadhany et al. | ............ | 188/297 |
| 2010/0072760 A1 * | 3/2010 | Anderson et al. | ............ | 290/1 R |

* cited by examiner

*Primary Examiner* — Bradley King
*Assistant Examiner* — Stephen Bowes
(74) *Attorney, Agent, or Firm* — Blakely Sokoloff Taylor & Zafman LLP

(57) ABSTRACT

A ride control system includes a shock absorber having a movable piston that divides the shock absorber into a lower and an upper volume and a center check valve that allows fluid to flow from the upper to the lower volume. A back pressure actuator provides a selectable back pressure to the lower volume. Three two way valves and a check valve allow the lower and upper volumes to be selectively coupled to either the selectable back pressure or a shock absorber fluid reservoir to provide passive, semi-active, or active ride control. The back pressure actuator pressurizes a hydraulic accumulator when shock absorber fluid flows into the back pressure actuator to provide energy recovery.

13 Claims, 1 Drawing Sheet

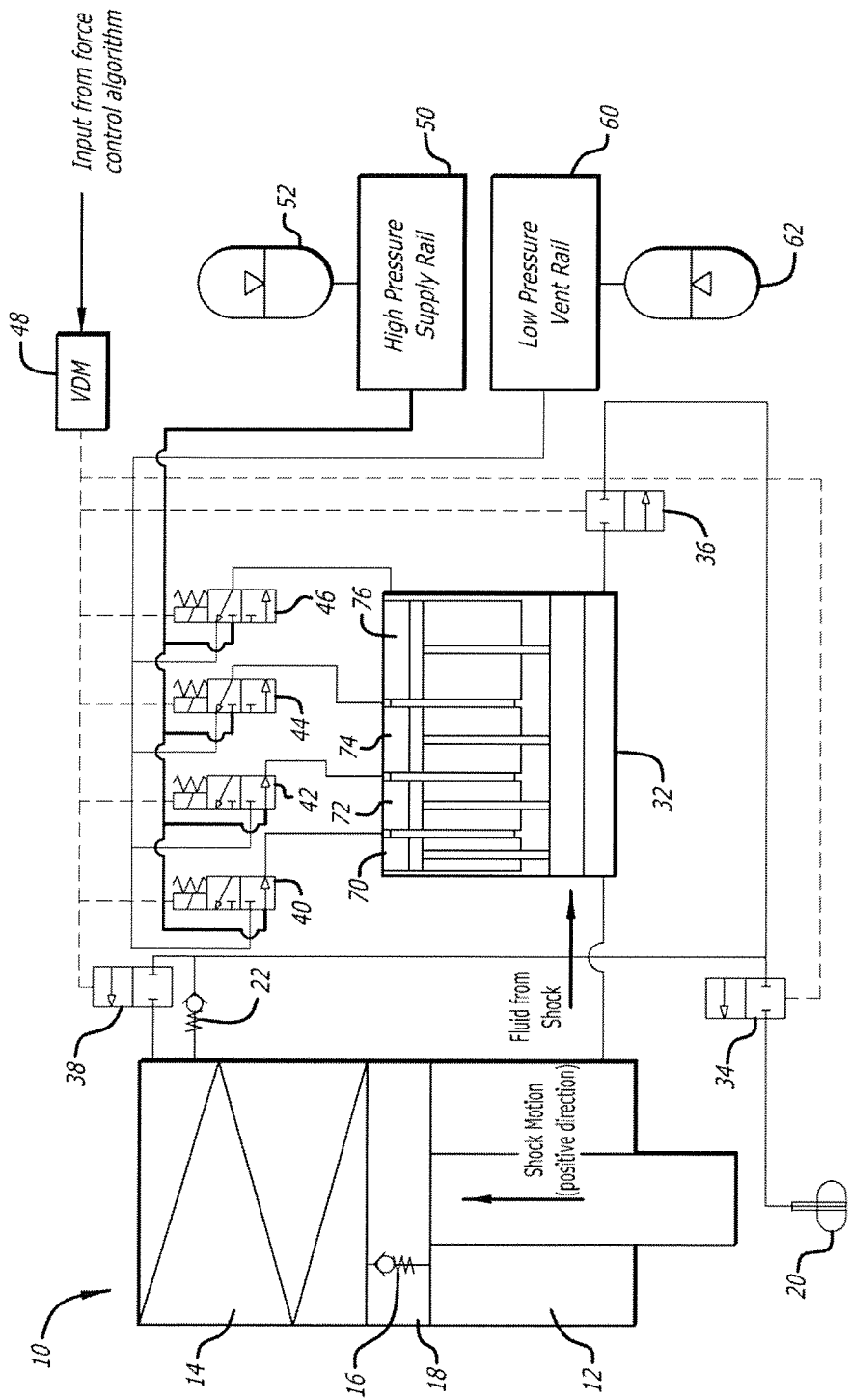

ACTIVE AND SEMI-ACTIVE RIDE CONTROL WITH ENERGY RECOVERY

CROSS REFERENCE TO RELATED APPLICATIONS

This application claims the benefit pursuant to 35 U.S.C. 119(e) of U.S. Provisional Application No. 61/375,737, filed Aug. 20, 2010, which application is specifically incorporated herein, in its entirety, by reference.

BACKGROUND

1. Field

Embodiments of the invention relate to the field of ride control systems; and more specifically, to ride control systems that can provide active ride control with energy recovery.

2. Background

Current methods for semi-active ride control apply a damping force to a shock absorber by creating back pressure by restricting the flow of fluid from the shock absorber. The damping energy is converted to heat by the flowing of the shock absorber fluid through an orifice.

In active control methods, similar methods are used to dissipate the damping energy, but force can also be applied to move the vehicle in a desired direction as opposed to just opposing the motion of the vehicle. These methods provide damping but do not recover the energy used to damp the vehicle motion.

In passive, semi-active and in most active ride control, the damping energy is converted to heat which needs to be transferred to the environment. These methods do not recover any of the damping energy. In active control, the energy to operate the system is a parasitic loss to the engine.

SUMMARY

The invention provides a means to apply a semi-active damping force (always opposes the motion of the vehicle) or active force (can oppose or act in the direction of motion of the vehicle) to a shock absorber and capture a significant portion of the vehicle damping energy as high pressure hydraulic fluid.

Other features and advantages of the present invention will be apparent from the accompanying drawings and from the detailed description that follows below.

BRIEF DESCRIPTION OF THE DRAWING

The invention may best be understood by referring to the following description and accompanying drawing that are used to illustrate embodiments of the invention by way of example and not limitation.

The FIGURE is a schematic diagram of a ride control system that embodies the invention.

DETAILED DESCRIPTION

In the following description, numerous specific details are set forth.

However, it is understood that embodiments of the invention may be practiced without these specific details. In other instances, well-known circuits, structures and techniques have not been shown in detail in order not to obscure the understanding of this description.

The basic layout of the system is shown in the FIGURE. The system consists of a shock absorber 10, a shock absorber fluid reservoir 20, a digital hydraulics system (which provides the desired force on the shock absorber and recovers a portion of the energy from the shock absorber motion as high pressure hydraulic fluid), a high pressure supply rail 50 and a low pressure vent rail 60. Hydraulic storage tanks (accumulators) 52, 62 are coupled to the high pressure supply rail 50 and the low pressure vent rail 60 to store changing volumes of fluid in these rails.

The digital hydraulics system consists of a series of three-way digital valves 40, 42, 44, 46 functioning as energy recovery actuators connected to either the high pressure supply rail 50 or the low pressure vent rail 60 via three-way digital valves, the back-pressure actuator 32 and several two-way digital valves that are used in semi-active and active ride control. The digital valves 34, 36, 38, 40, 42, 44, 46 are controlled via a valve drive module (VDM) 48 based on the force (and thus back pressure) that is desired on the shock absorber 10.

The three digital two-way valves 34, 36, 38 in the system are used to control the pressure on both sides of the shock absorber 10 for semi-active and active ride control. If the Back Pressure two-way valve (BP 2-way) 36 and the Active Control two-way valve (AC 2-way) 34 are open and the Refill Check Bypass two-way valve (RCB 2-way) 38 is closed, the system is in passive mode with no energy recovery. Damping is provided by the flow area through the BP 2-way valve 36. If the BP 2-way is closed valve 36, the AC 2-way valve 34 is open, and the RCB 2-way valve 38 is closed, the system is in semi-active mode with energy recovery. The system is in full active mode when all three two way valve s 34, 36, 38 can be either open or closed based on the motion of the shock absorber 10 and the desired direction of the force on the shock absorber. Different arrangements of the digital hydraulics system can be configured to give more or less precise control of the force profile applied to the back pressure actuator 32.

The system operation is described for both semi-active and active control below.

Semi-Active Ride Control Mode

In the semi-active control mode, the AC 2-way valve 34 is always left open to the shock absorber fluid reservoir 20. Whether the shock absorber 10 moves up or down, the fluid leaves the shock absorber from the lower volume 12 into the back pressure actuator 32.

If the shock absorber 10 is moving upward, a center check valve 16 in the center of the shock absorber opens, allowing fluid to flow from the upper volume 14 to the lower volume 12. Since the upper volume 12 has approximately twice the actuator area as the lower volume 12, the upward motion of the shock absorber 10 results in twice as much reduction in volume in the upper volume than is added in the lower volume. The center check valve 16 has a large flow area so there is minimal pressure drop from the upper volume 14 to the lower volume 12 when fluid is flowing through the center check valve. The upper and lower volumes 12, 14 are thus at approximately the same pressure, but the upper volume 12 has an actuator with twice the area and thus a damping force in the downward direction is realized.

The magnitude of the damping force depends on the pressure in the shock absorber volumes 12, 14 and thus on the back pressure on the system. The back pressure is normally controlled in prior art systems by controlling the flow area for fluid flow out of the lower volume 12 to the shock absorber fluid reservoir 20. In the inventive system the back pressure is controlled by controlling the force applied to the back pressure actuator 32.

In the illustrated configuration, four energy recovery actuators 70, 72, 74, 76 are attached to the back pressure actuator 32 to apply this force. The recovery actuators 70, 72, 74, 76 both apply the force to create the back pressure and capture that force as high pressure hydraulic fluid. Each energy recovery actuator 70, 72, 74, 76 can either be connected to the vent rail 60 or the high pressure rail 50. Any number of energy recovery actuators, each having a different area, can be attached to the back pressure actuator 32. The number of recovery actuators and area for each actuator is dictated by the level and precision of force control needed. The energy recovery actuators 70, 72, 74, 76 in the illustrated arrangement are sized so that the smallest actuator 70 has 1× area, the 2nd actuator 72 has 2× area, the 3rd actuator 74 has 4× area and the 4th actuator 76 has 8× area. The sizing is chosen so that any integer from 0× to 15× area can be connected to the high pressure rail 50 depending on which control valves 40, 42, 44, 46 are actuated.

As fluid flows from the shock absorber 10 when the shock absorber moves, it pushes the back pressure actuator 32 up and pushes fluid from the energy recovery actuators 70, 72, 74, 76 in to either the high pressure supply rail 50 or the low pressure vent rail 60 depending on which rail the given energy recover actuators are connected to by the 3-way control valves 40, 42, 44, 46. If more damping force is desired, more energy recovery actuator area is connected to the supply rail 50. When no damping force is required, the BP 2-way valve 36 between the back pressure actuator 32 and the shock absorber fluid reservoir 20 is opened (the AC 2-way valve 34 always being left open to the shock absorber fluid reservoir in the semi-active control mode). The energy recovery actuators 70, 72, 74, 76 refill from the vent rail 60 and push the fluid from the back pressure actuator 32 to the shock absorber fluid reservoir 20. This action also resets the back pressure actuator 32 to the zero position for the next chance to apply damping force and recover the damping force as high pressure hydraulic energy.

If the shock absorber 10 is moving downward, the center check valve 16 in the center of the shock absorber closes and the refill check valve 22 on the upper volume 14 opens. With the refill check valve 22 open, the upper volume 14 remains at the shock absorber fluid reservoir 20 pressure (the AC 2-way valve 34 always being left open to the shock absorber fluid reservoir in the semi-active control mode). The lower volume 12 will be at the specified back pressure. The back pressure is then set to give the desired damping force to the downward piston motion. As the shock absorber piston 18 moves down, the excess fluid flows to the back pressure actuator 32, moving it upward and recovering the damping energy as described earlier.

Active Ride Control Mode

The active control mode is very similar to the semi-active mode described above. However in the active mode, the system can actively control the force on either side of the shock absorber piston 18 regardless of the direction of motion of the shock absorber 10.

If the shock absorber is moving downward and a downward force is desired, the BP 2-way valve 36 is opened and the AC 2-way valve 34 is closed. The back pressure is still controlled via the back pressure actuator 32, but with the AC 2-way valve 34 closed, back pressure is applied to both the upper 14 and lower 12 volumes. The upper volume 14 having approximately twice the actuator area of the lower volume 12, a downward force is realized. The size of that force is dependent on the level of back pressure.

If an upward force is needed when the shock absorber 10 is moving down, the same control as used in the semi-active mode is used as described above.

If the shock absorber 10 is moving upward and an upward force is desired, the AC 2-way valve 34 is opened and the RCB 2-way valve 38 is opened. This ensures that the upper volume remains at the shock absorber reservoir pressure. The BP 2-way valve 36 is closed and the lower volume 12 pressure is controlled by the back pressure actuator 32. The lower volume 12 pressure is higher than the upper volume 14 pressure, so the center check valve 16 remains closed. The make up fluid for the lower volume 12 must then come from the back pressure actuator 32.

If a downward force is desired when the shock absorber is moving upward, the same control as used in the semi-active mode is used.

The ride control system as described above allows on demand switching between passive, semi-active and active ride control. Vehicle damping energy is captured in an accumulated hydraulic storage tank 52. The back pressure actuator 32 controls damping pressure for the shock absorber 10. Multiple energy recovery actuators 70, 72, 74, 76 provide controllable force on the back pressure actuator 32. The multiple recovery actuators are connected to the high pressure supply rail 50 for recovering vehicle damping energy. The three two-way valves 34, 36, 38 enable switching between passive, semi-active, and active ride-control.

While certain exemplary embodiments have been described and shown in the accompanying drawings, it is to be understood that such embodiments are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

What is claimed is:

1. A ride control system comprising:
a shock absorber having a movable piston that divides the shock absorber into a lower volume and an upper volume;
a center check valve that allows fluid to flow from the upper volume to the lower volume of the shock absorber;
a back pressure actuator in fluid communication with the lower volume of the shock absorber, the back pressure actuator providing a selectable back pressure;
an active control two-way valve having a first and second ports, the first port being in fluid communication with a shock absorber fluid reservoir;
a refill check bypass two-way valve having a third and fourth ports, the third port being in fluid communication with the upper volume of the shock absorber;
a back pressure two-way valve having a fifth and sixth ports, the fifth port being in fluid communication with the back pressure actuator and the sixth port being in fluid communication with the second port of the active control two-way valve and with the fourth port of the refill check bypass two-way valve; and
a refill check valve that allows fluid to flow to the upper volume to the second port of the active control two-way valve from the fourth port of the refill check bypass two-way valve.

2. The ride control system of claim 1 further including:
a high pressure supply rail;
a low pressure supply rail;

a plurality of recovery actuators mechanically coupled to the back pressure actuator to provide the selectable back pressure; and a plurality of three-way control valves, each three-way control valve fluidly coupled to the high pressure supply rail, the low pressure supply rail, and one of the recovery actuators, each three-way control valve selectably coupling one of the recovery actuators to one of the high pressure supply rail and the low pressure supply rail to select the back pressure.

3. The ride control system of claim 2 wherein each of the plurality of recovery actuators has a different area so that a different force is provided to the back pressure actuator by each of the plurality of recovery actuators when coupled to the high pressure supply rail.

4. The ride control system of claim 2 further including a valve drive module coupled to the active control two-way valve, the refill check bypass two-way valve, the back pressure two-way valve, and the plurality of three-way control valves to control the force applied to the shock absorber by fluid in the lower and upper volumes.

5. The ride control system of claim 2 further including a high pressure accumulator fluidly coupled to the high pressure supply rail and a low pressure accumulator fluidly coupled to the low pressure supply rail.

6. The ride control system of claim 1 further including a valve drive module coupled to the active control two-way valve, the refill check bypass two-way valve, and the back pressure two-way valve to select one of a passive ride control, a semi-active ride control, and an active ride control.

7. A method of providing ride control comprising:

fluidly coupling a lower volume and an upper volume of a shock absorber through a center check valve that allows fluid to flow from the upper volume to the lower volume, the upper and lower volumes being created by a movable piston;

providing a passive ride control by fluidly coupling a shock absorber fluid reservoir to the upper volume of the shock absorber through a refill check valve that allows fluid to flow from the fluid reservoir to the upper volume and fluidly coupling the shock absorber fluid reservoir to the lower volume of the shock absorber;

providing a semi-active ride control by fluidly coupling the shock absorber fluid reservoir to the upper volume of the shock absorber through the refill check valve and applying a selectable back pressure to the lower volume of the shock absorber;

providing a first active ride control that applies a downward force when the movable piston is moving down by applying the selectable back pressure to the upper volume and the lower volume of the shock absorber; and providing a second active ride control that applies an upward force when the movable piston is moving up by fluidly coupling the shock absorber fluid reservoir to the upper volume of the shock absorber and applying the selectable back pressure to the lower volume of the shock absorber.

8. The method of providing ride control of claim 7 wherein providing the passive ride control further includes opening an active control two-way valve and a back pressure two-way valve to couple the shock absorber fluid reservoir to the lower volume of the shock absorber.

9. The method of providing ride control of claim 7 wherein providing the second active ride control that applies the upward force when the movable piston is moving up further includes opening a refill check bypass two-way valve to couple the shock absorber fluid reservoir to the upper volume of the shock absorber.

10. The method of providing ride control of claim 7 wherein the selectable back pressure is selected by selectably exposing a plurality of recovery actuators to a high pressure supply rail and mechanically coupling the recovery actuators to a back pressure actuator that provides the selectable back pressure.

11. The method of providing ride control of claim 10 wherein the plurality of recovery actuators have effective areas that double for each successive actuator.

12. The method of providing ride control of claim 10 further comprising recovering energy by pressurizing a high pressure accumulator coupled to the high pressure supply rail when fluid is transferred from the shock absorber to the back pressure actuator.

13. The method of providing ride control of claim 10 wherein each of the plurality of recovery actuators is coupled to a three-way control valve and the method further comprises operating the three-way control valves to couple each of the recovery actuators to one of the high pressure supply rail and a low pressure supply rail to select the back pressure.

* * * * *